United States Patent [19]
Bacher et al.

[11] Patent Number: 5,698,237
[45] Date of Patent: Dec. 16, 1997

[54] APPARATUS FOR GRANULATING SYNTHETIC PLASTICS MATERIALS

[76] Inventors: Helmut Bacher, Bruck/Hausleiten 17; Helmuth Schulz, Badstrasse 20, both of St. Florian, Austria, A/4490; Georg Wendelin, Waldbothenweg 84, Linz, Austria, A-4033

[21] Appl. No.: 702,207

[22] Filed: Aug. 23, 1996

Related U.S. Application Data

[63] Continuation of Ser. No. 256,813, filed as PCT/AT93/00016 Feb. 10, 1993, abandoned.

[30] Foreign Application Priority Data

Feb. 10, 1992 [AT] Austria ............................ 217/92

[51] Int. Cl.⁶ .................................................. B29C 47/38
[52] U.S. Cl. .................... 425/311; 264/142; 425/208; 425/313; 425/382 R; 425/DIG. 230
[58] Field of Search ........................ 425/311, 312, 425/382 R, 313, 381.2, DIG. 230, 308, 200, 310, 208; 264/142, 148

[56] References Cited

U.S. PATENT DOCUMENTS

| | | | |
|---|---|---|---|
| 3,286,660 | 11/1966 | Peterson | 425/DIG. 230 |
| 4,099,900 | 7/1978 | Bradbury et al. | 425/313 |
| 4,145,453 | 3/1979 | Lenhardt, Sr. | 264/148 |
| 5,009,586 | 4/1991 | Pallmann | 425/311 |
| 5,153,008 | 10/1992 | Koch | 425/207 |
| 5,186,959 | 2/1993 | Tanaka | 425/313 |
| 5,215,764 | 6/1993 | Davis et al. | 425/208 |
| 5,344,300 | 9/1994 | Shapcott | 425/308 |

FOREIGN PATENT DOCUMENTS

| | | | |
|---|---|---|---|
| 1599234 | 10/1990 | U.S.S.R. | 425/381.2 |
| 220008 | 8/1924 | United Kingdom | 425/311 |

*Primary Examiner*—Jeffery R. Thurlow
*Attorney, Agent, or Firm*—Salter & Michaelson

[57] ABSTRACT

An apparatus for granulating thermally unstable synthetic plastic material includes a tip-driven plasticizing screw positioned in a housing. The screw conveys the synthetic plastic material through exit openings in the housing, wherein granulating knives slidably engaged with the housing exit openings cut-off pellets of synthetic plastic material. The drive mechanism for the plasticizing screw is disposed at the exit opening side of the screw with the orbit of the granulating knives disposed between the exit openings and the drive mechanism. The drive shaft of the plasticizing screw is detachably coupled to the front, or exit, end of the screw. A conveyor blower cools the pellets as they are severed from the exit openings, and further operates to convey the pellets to a storage bin for packaging.

9 Claims, 2 Drawing Sheets

APPARATUS FOR GRANULATING SYNTHETIC PLASTICS MATERIALS

This is a continuation of application Ser. No. 08/256,813, filed as PCT/AT93/00016 Feb. 10, 1993, now abandoned.

BACKGROUND AND SUMMARY OF THE INVENTION

The invention relates to an apparatus for granulating synthetic plastic material, in particular thermally unstable, highly viscous synthetic plastic material, for example polyvinyl chloride or polyvinylidene chloride, comprising at least one rotating granulating knife which rotates in front of outlet openings for the synthetic plastic material through which the plasticized synthetic plastic material is pressed by a plasticizing screw bearingly supported for rotation within a housing immediately in front of the outlet openings and rotated by a drive means, the synthetic plastic material passing through these outlet openings with a component of motion directed in axial direction of the plasticizing screw, and a cooling means for cooling the synthetic plastic material pellets cut off by the granulating knife.

The apparatus of this kind known until now comprise in the most cases a granulating housing in which the outlet end of a screw extruder discharges by a nozzle plate creating the synthetic plastic material cords. The screw extruder is charged at the other front end and is driven by an elongation of the screw shaft which extends beyond the charging location. As a rule, the pellets cut off in the granulating housing are cooled by cooling water directed into the region of the knife and are conveyed off together with the cooling water running off. Such constructions have the disadvantage within such plants which are thought for treating sensitive synthetic plastic materials, in particular such synthetic plastic material which are thermally unstable and tend to a reduction of the molecule chains if they remain in the hot region for a longer time. Polyvinyl chloride or polyvinylidene chloride are examples for such sensitive synthetic plastic material kinds. The longer dwell times result from deviations in the flow of the treated synthetic plastic material which must be fed in direction perpendicular to the longitudinal direction of the screw, and from back-up spaces and frictions in connection which such deviations, as well as from flow channels increasing the dwell time.

A further disadvantage consists in that such screw extruders which are driven in the region of the inlet end of the screw, cannot be used in cases in which it would be desirable to feed the screw at its front end in substantially axial direction, thus for example within processing plants for recycling goods in which the screw housing is connected in radial direction to the exit opening of a receptacle in which the synthetic plastic material is comminuted by means of rotating knives.

It is also known (EP-A 373,372) to use a screw protruding into a filling hopper for the purpose to convey the synthetic platic material to be plasticized into a plasticizing chamber in which the synthetic plastic material is plasticized by means of rotating pressing wings and is pressed out of the plasticizing chamber in radial direction through exit openings disposed on the periphery of the plasticizing chamber. Granulating knives rotate outside these exit openings and are connected to a hub surrounding the driving shaft of the conveyor screw. This construction is disadvantageous because the synthetic plastic material introduced into the plasticizing chamber must be plasticized in a very short time if it should be ensured that the plasticized material can be pressed through the exit openings. This requires a high power demand to drive the pressing wings. Further it is of disadvantage that the knives which rotate on the outer periphery of the exit openings formed by a perforated ring, together with their holding devices constitute a considerable mass, and again an increased power demand is required for its motion.

The invention has at its object to improve an apparatus of the initially described kind so that the synthetic plastic material processed at a low power expenditure is gently treated and that the applicability of the apparatus is made more versatile. In particular, it should be possible to use an apparatus of the initially described kind also within the mentioned recycling-processing plants. The invention solves this task by the features that the exit openings are disposed adjacent to the drive-side front end of the tip-driven plasticizing screw and that the drive means for the plasticizing screw comprises a shaft which is disposed coaxially to this drive-side front end and is surrounded by the circulation path of the knife disposed between the drive means and the exit openings and which shaft constitutes a member separate from the plasticizing screw that is coupled for common rotation and detachably to the front end of the plasticizing screw.

Unlike the initially described known construction, the screw of the inventive apparatus is therefore provided with a tip drive means, that means, it is driven at that front end towards which the screw conveys. Thereby the other front end of the screw not facing the exit end of the synthetic plastic material is made free and the synthetic plastics material can be supplied there without any problem. Therefore, it is possible to connect the inventive apparatus with the screw housing at least substantially radial to a processing receptacle for the synthetic plastic material and thereby to make use of the centrifugal force for the purpose of filling the screw, which centrifugal force is exerted to the comminuted synthetic plastic material by the knives revolving within the processing receptacle. Further, a compact construction having short flow paths for the plasticized synthetic plastic material is obtained so that the dwell times of this material in the hot region are comparatively low and therefore the danger of thermic deteriorations of the processed synthetic plastic material is decreased. Since the exit openings are disposed immediately in front of the front end of the screw, its greatest distance from the screw axis is not greater than the screw diameter so that also the knives must only show this maximum distance from the screw axis. Thereby, if compared with the above described known construction, a substantially reduced moved mass is obtained for the knives and thereby a reduced energy expenditure. Further, plasticizing of the synthetic plastic material to be processed by means of the plasticizing screw can be made in a more energy-saving and gently-treating manner than with the pressing wings of the known construction. The detachable connection between the driving shaft and the plasticizing screw facilitates disassembly of the screw for the purpose of cleaning or if worn.

It is known for granulating of polymer fibre ropes (SU-A-1,452,682) to introduce these polymer fibre ropes into peripheral grooves of a screw housing extending in axial direction, and to convey them there by means of a conveyor screw to a granulating knife revolving around the screw axis, this granulating knife revolving at the front-side end of the screw housing around the axis of the screw shaft. Within this, no plasticizing of the supplied synthetic plastic material takes place so that the problems solved by the invention do not occur here.

It would be possible within the spirit of the invention to let the screw convey towards a separate perforated plate, the knife revolving at the exit side thereof. Such a separate perforated plate, however, can be avoided within the spirit of the invention by the feature that the exit openings are confined by the screw and its housing. Therefore, the screw with its housing constitutes at the same time the nozzle channels through which the synthetic plastic material supplied by the screw is extruded.

A preferred embodiment of the invention consists in that the shaft is formed as a hollow shaft and is coupled by means of a screw in the front end of the screw for common motion in axial direction and axially adjustable and also coupled for common rotation with the screw by at least one wedge or a toothed connection. This is a particular simple construction which enables one to exactly adjust the axial position of the extruder screw by rotating the screw in order to ensure that the front end of the extruder screw and the front end of its housing are positioned exactly in one common plane to that the knife can exactly cut off the synthetic plastic material cords discharging from the nozzle channels.

As already mentioned, it is suitable to dispose the exit openings between the screw and its housing. For this, there exist substantially two main variants: It would be possible to machine the exit openings or the channels forming them into the inner periphery of the screw housing. So formed channels would stand still and the knife could rotate together with the screw. As a rule, however, the revolution speed of the screw will not be great enough to obtain the desire cut-off of the pellets by the knife. Therefore, it is more favourable within the spirit of the invention to form the exit openings by longitudinal channels at the periphery of a flange at the drive-side front end of the screw, the flange immediately neighbouring the last volutions of the screw and contacting the inner surface of the housing, the knife being bearingly supported for rotation on the shaft and being connected with a drive means for relative rotation with respect to the shaft. Thus, so formed longitudinal channels leading to the exit openings rotate together with the screw what requires the separate drive means for the knife, however, this does not constitute a disadvantage in comparison with the initially described known construction because also there a separate drive means for the knife is necessary. The separate drive means for the knife enables one to rotate the knife with the desired speed without any problem so that a perfect cut-off of the pellets is ensured. A preferred further embodiment of the lastly described construction consists within the spirit of the invention in that the knife is fastened to the front end neighbouring the screw of a sleeve rotatably supported on the shaft, which sleeve is driven preferably by means of a toothed belt, for rotation of the knife.

Cleaning of the channels leading to the exit openings is facilitated if within the spirit of the invention the section of the housing covering the longitudinal channels constitutes a ring separate from the remaining housing, however detachably connected with it, preferably by means of screws. In such a manner, the longitudinal channels leading to the exit openings can be made free without that for this the screw must be disassembled.

According to a further embodiment of the invention, the cooling means is formed by a blower which at the same time constitutes a conveyor means for the pellets cut-off and comprises an air channel leading to the knife and preferably being disposed radially with respect to the shaft, and a discharge channel leading from the knife to a collecting station for the pellets and preferably also being disposed radially with respect to the shaft. Such an air cooling for the cut-off pellets in the most cases is sufficient for sensitive synthetic plastic material kinds, the extrusion temperature of which is not so high. In operation, the air cooling is more inexpensive than the water cooling and separate means for drying the granulate particles can be saved. A separate granulating housing can be saved within the spirit of the invention, if the air channel and the discharge channel on the one side are confined by a wall supporting the housing of the screw and on the opposite side by a disk connected to the shaft or to the sleeve positioned on it.

BRIEF DESCRIPTION OF THE DRAWINGS

In the drawing, the object of the invention is schematically shown by way of an exemplative embodiment.

DETAILED DESCRIPTION OF THE PREFERRED EMBODIMENT

Figure 1:
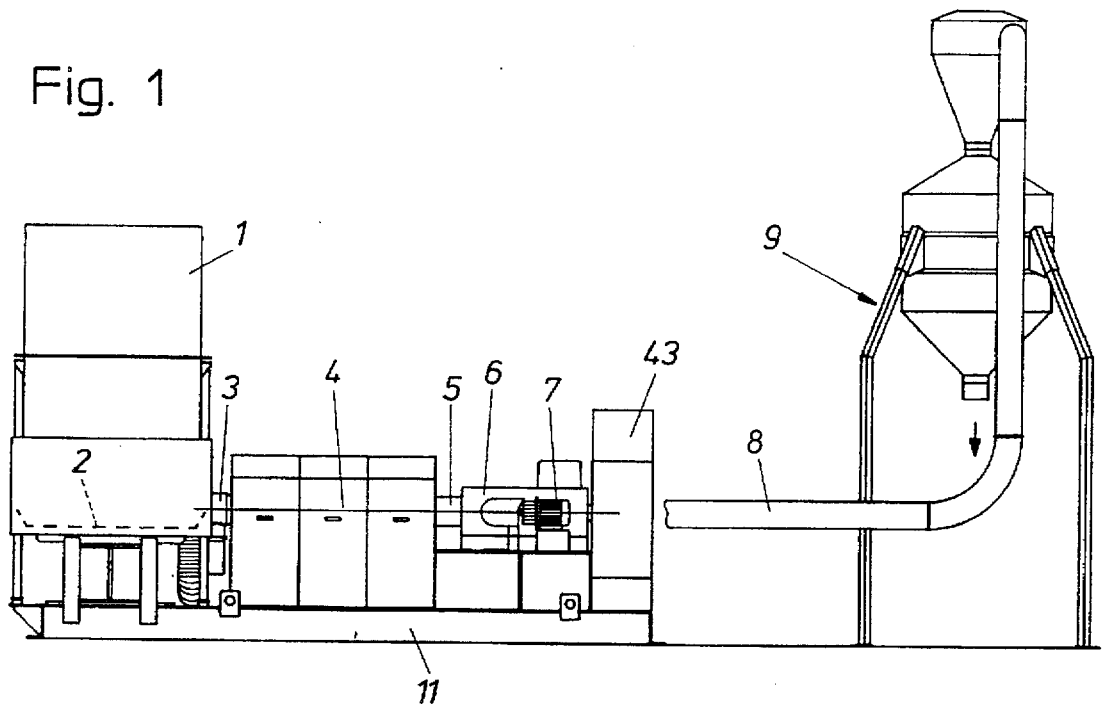
FIG. 1 shows a granulating plant provided with the inventive apparatus, in a side view.
Figure 2:
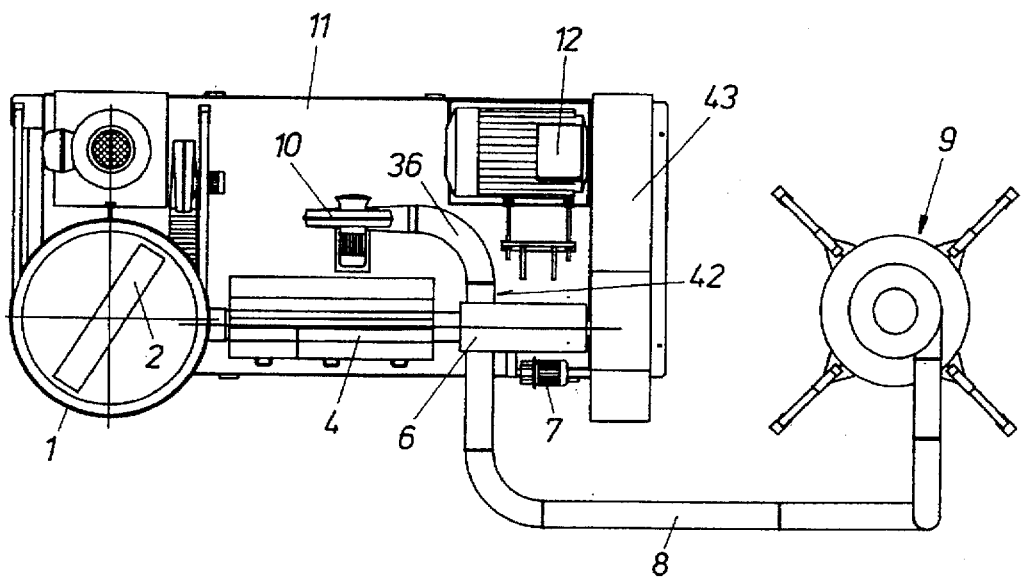
FIG. 2 is a top view to FIG. 1.

The plant according to FIGS. 1 and 2 comprises a receptacle 1 for the synthetic plastic material to be processed which is filled into the receptacle 1 from above. A knife 2 rotates around the vertical axis of the receptacle in the bottom region of the receptacle 1 and comminutes the synthetic plastic material within the receptacle 1. The comminuted material is pressed through an opening in the wall of the receptacle 1 into the intake opening of a screw extruder 3 disposed radially with respect to the receptacle 1, by which screw extruder the material is plasticized. Heating zones and, respectively, or cooling zones 4 can be related to the screw extruder 3. By means of the heating zones the desired processing temperature can be obtained. If this temperature is exceeded, for example by the influence of friction heat, the desired temperature can be ensured by means of the cooling zones. The front end 5 of the screw extruder 3 protruding from these means 4 leads to a granulating head 6 in which a granulating knife driven by a granulating drive means 7 cuts-off the pellets. The pellets cut-off are conveyed off the granulating head 6 through tubes 8 to a sack filling station 9. The conveyance is made by an air stream created by a conveyor blower 10. The drive means 12 for the screw extruder 3 is also provided on the bottom plate 11 of the plane, which drive means drives the tip-side end of the screw.

Figure 3:
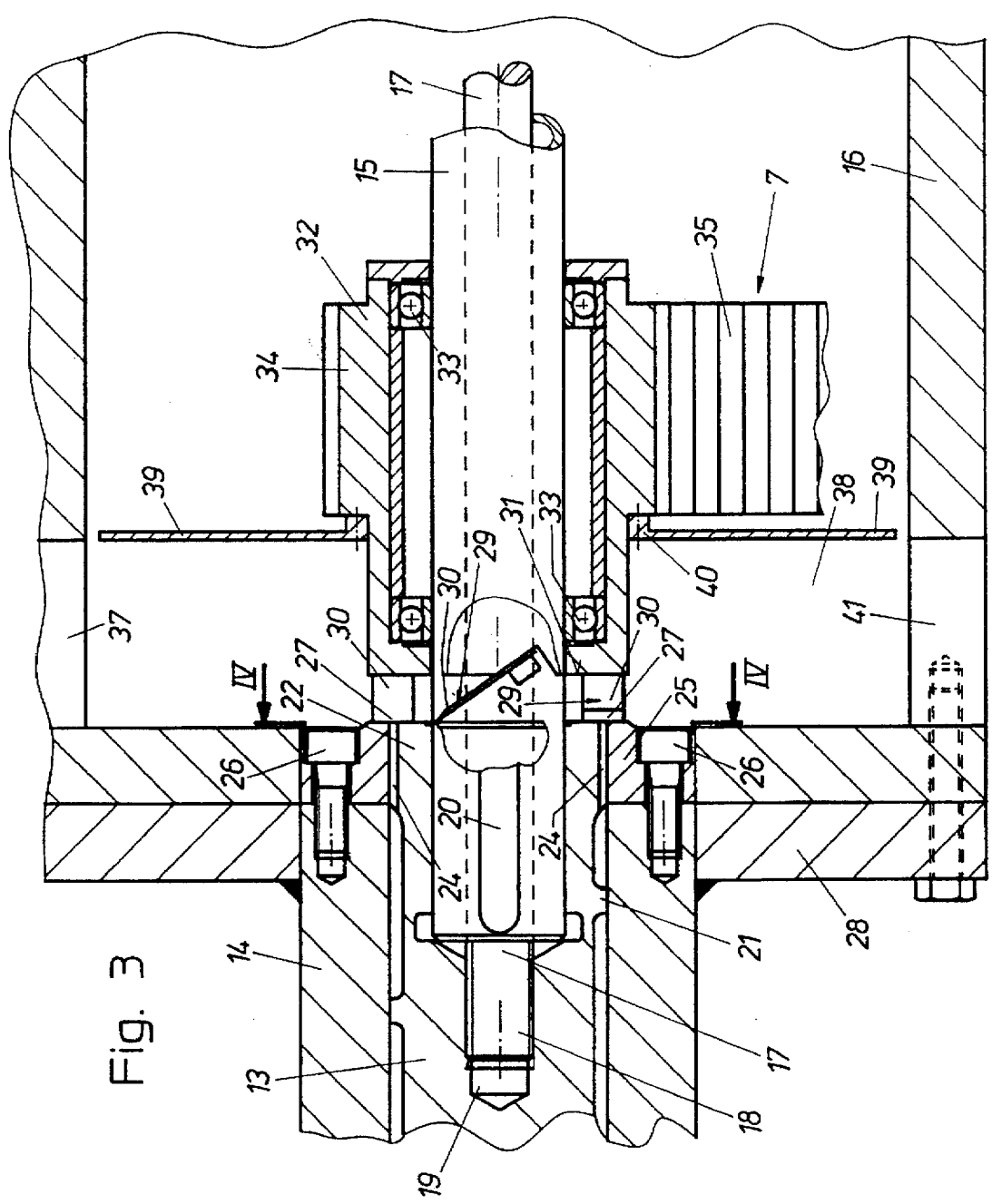
FIG. 3 shows in an enlarged scale and in section the front end of the screw provided with the screw drive means.
Figure 4:
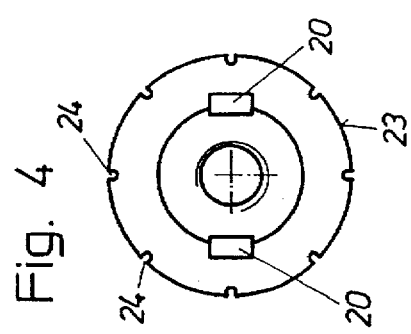
FIG. 4 is a front view seen in direction of the arrow IV—IV of the front end of the screw.

In FIG. 3 this end of the screw is shown more in detail. The screw 13 is bearingly supported in a cylindrical housing 14 which is connected to the said exit opening of the receptacle 1. The drive means 12 for the screw drives a shaft 15 which extends coaxially to the screw 13 and is bearingly supported in the frame 16 of the apparatus. This shaft 15 is a hollow shaft through which extends a rod 17 which on its end facing the screw 13 carries screw threads constituting a screw 18 which can be screwed into a corresponding threaded bore 19 of the screw 13. On the other end, the rod 17 is supported in any desired manner on the hollow shaft 15, for example by means of a flange, not shown, which engages the end of the hollow shaft 15. Thereby not only a detachable connection between the screw 13 and the shaft 15 is obtained, but also the possibility to adjust the position of the screw 13 in axial direction in a simple and easy operable manner by rotation of the rod 17, as long as the shaft 15 is secured against displacement in its longitudinal direction, for example in its drive means 12. Thereby it can be ensured that the front end of the screw 13 and the front end of the housing 14 are always exactly positioned in a common plane. By two wedges 20 or by a toothed connection it is ensured that there is a connection for rotation between the driving shaft 15 and the screw 13 and simultaneously, that these members can be shifted in longitudinal direction relative to each other. The screw 13 has a flange 22 immediately adjacent to its last volutions 21, which on its periphery 23 is provided with some longitudinal or spiral channels 24 spaced apart from each other in equal distances and extending in longitudinal direction of the screw 13, which channels immediately neighbour the plasticizing screw 13. These channels 24 are covered by a ring 25 forming a section of the screw housing 14 and being detachably fastened to the body member of the screw housing by means of screws 26, so that an easy exchange of the screw 13 or of the ring 25 in case of wear is possible and for the purpose that the longitudinal channels 24 can be easy made free for cleaning without the necessity to disassemble the screw 13o The longitudinal channels 24 with their ends disposed on the outer front end of the ring 25 constitute the exit openings 27 through which the plasticized synthetic plastic material supplied by the screw 13 is pressed out of the longitudinal channels or spiral channels 24. The front end of the housing 14 together with the ring 25 is supported by a vertical wall 28 of the frame 16. One or more granulating knives 29 provided with cutting edges 30 revolve in front of the exit openings 27, which knives with their path disposed between the drive means of the screw 13 and the exit openings 27 concentrically surround the shaft 15 and are fixed to the front side 31 of a sleeve 32 which is bearingly supported on the shaft 15 by means of rolling bearings 33. The sleeve 32 carries on its outer side a toothed ring 34 driven from the granulating drive means 7 (FIG. 1) by means of a toothed belt 35. The speed of revolution of the sleeve 32 and therefore of the knife 29 is substantially greater than that of the shaft 15 so that a sufficient relative velocity between the revolving exit openings 27 and the also revolving knife 29 is obtained. Suitably, the knife 29 revolves in a direction which is opposite to the revolving direction of the screw 13.

The granulate pellets cut-off by the cutting edges 30 of the knives 29 are conveyed off by means of an airstream created by a conveyor blower 10 (FIG. 2) which simultaneously provides for a sufficient cooling of the cut-off synthetic plastic material particles. For this, a curved tube 36 (FIG. 2) leads the supplied cold air from the conveyor blower 10 to a lateral inlet opening 37 (FIG. 3) of the frame 16, and a cooling means can be provided for the air. The opening 37 leads into an annular space 38 which on the one side is confined by the wall 28 of the frame 16 and on the other side by a disk 39 fixed on a step 40 of the sleeve 32 and rotating therewith. An exit opening 41 is disposed on the side of the frame 16 that is opposite to the side of the inlet opening 37, through which exit opening the conveyor air together with the granulate pellets conveyed by it enters the tube 8 (FIG. 2). Suitably, the frame 16 has a circular cross section in the region of the shaft 15 so that as less as possible dead corners are formed for the conveyor air entering through the opening 38 and escaping through the opening 41, so that it is ensured that the cut-off synthetic plastic material pellets are conveyed off. Such a cooling means 42 (FIG. 2) has proved to be good, inasmuch just at processing of polyvinyl chloride no very high temperatures and glueinesses occur.

The drive means 12 for the screw 13 can be provided with a control gear means 43 (FIG. 2) for the purpose to adjust at choice the revolution speed of the screw 13.

We claim:
1. An apparatus for granulating synthetic plastic material comprising:
   a cylindrical housing having an inlet end and an outlet end and a cylindrical inner surface;
   a plasticizing screw bearingly supported for rotation within said cylindrical housing, said screw having a first end adjacent said inlet end of said housing and a second end adjacent said outlet end of said housing;
   means for introducing synthetic plastic material into the inlet end of said cylindrical housing, said screw further having a plurality of volutions engaging said inner surface of said housing between said inlet and outlet ends and being operable for plasticizing and conveying said synthetic plastic material from said inlet end of said housing toward said outlet end;
   an outlet ring disposed in said outlet end of said housing, said ring including a plurality of outlet openings extending in a direction having a component directed generally parallel to an axis of rotation of the screw, said conveyed synthetic plastic material being pressed by said plasticizing screw through said outlet openings;
   a drive shaft assembly positioned at the outlet end of the housing coaxially to said axis of rotation of said screw, said drive shaft assembly being detachably coupled to said screw at said second end thereof for common rotation thereof;
   drive means for rotating said drive shaft assembly;
   a granulating knife assembly supported for relative rotation about said drive shaft assembly adjacent said outlet openings, said granulating knife assembly including at least one granulating knife which engages and cooperates with the outlet openings during rotation of said granulating knife assembly for severing pellets of synthetic plastic material from said plasticized synthetic plastic material as said synthetic plastic material is pressed through said outlet openings; and
   means for rotating said granulating knife assembly relative to said drive shaft assembly.

2. In the apparatus of claim 1, said outlet openings being defined by a plurality of longitudinal channels formed on the outer periphery of a flange at the second end of the screw, said outer periphery of said flange engaging said inner surface of said housing at the outlet end thereof.

3. In the apparatus of claim 2, said inner surface of said housing which is engaged by said flange comprising a separable ring detachably mounted to the outlet end of the housing.

4. In the apparatus of claim 1, said drive shaft assembly comprising an outer hollow shaft, and an inner rod concentrically received in said outer hollow shaft, said outer hollow shaft being slidably received in an axial opening in the second end of the screw, said rod having a threaded post which is received in a corresponding threaded axial bore in said axial opening, said outer hollow shaft and said axial opening including longitudinally slidable interengaging formations for rotatably connecting the outer hollow shaft to the screw, said longitudinally slidable interengaging formations permitting relative longitudinal movement of said outer hollow shaft and said screw.

5. In the apparatus of claim 4, said granulating knife assembly comprising a sleeve bearingly supported for rotation about said outer hollow shaft of said drive shaft assembly, said at least one granulating knife being disposed on a front end of the sleeve adjacent the outlet openings, said means for rotating said granulating knife assembly including a toothed belt extending around said sleeve.

6. The apparatus of claim 1 further comprising means for cooling said pellets as they are severed at the outlet openings.

7. The apparatus of claim 1 further comprising frame means for defining an annular space at the outlet end of the housing, said annular space surrounding said drive shaft assembly and said granulating knife assembly, said frame means including an inlet opening in one side thereof and an outlet opening in an opposite side thereof, said apparatus further comprising a conveyor blower coupled to said inlet opening of said frame means by tubing members, said conveyor blower providing an air flow through annular space operable for cooling said synthetic plastic pellets as they are severed from the outlet openings and for conveying said pellets outwardly of said frame means through said outlet opening thereof.

8. In the apparatus of claim 7, said annular space being defined at a front end thereof by a wall at the outlet end of said housing, and at a rear end thereof by a disc rotatably supported around said drive shaft assembly.

9. In the apparatus of claim 7, said inlet and outlet openings of said frame means extending radially to said axis of said drive shaft assembly.

* * * * *